United States Patent
Sung

(10) Patent No.: US 11,660,999 B2
(45) Date of Patent: May 30, 2023

(54) DEVICE AND METHOD FOR CONTROLLING LAMP FOR VEHICLE

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 335 days.

(21) Appl. No.: 17/126,852

(22) Filed: Dec. 18, 2020

(65) Prior Publication Data
US 2021/0197709 A1    Jul. 1, 2021

(30) Foreign Application Priority Data

Dec. 31, 2019  (KR) .................. 10-2019-0179593

(51) Int. Cl.
| | | |
|---|---|---|
| *B60Q 1/14* | (2006.01) | |
| *G01C 21/00* | (2006.01) | |
| *G01S 13/931* | (2020.01) | |
| *G01S 13/86* | (2006.01) | |
| *G06V 20/58* | (2022.01) | |
| *H04N 7/18* | (2006.01) | |

(52) U.S. Cl.
CPC ......... *B60Q 1/143* (2013.01); *G01C 21/3844* (2020.08); *G01S 13/867* (2013.01); *G01S 13/931* (2013.01); *G06V 20/584* (2022.01); *B60Q 2300/05* (2013.01); *B60Q 2300/30* (2013.01); *G01S 2013/93271* (2020.01); *G01S 2013/93274* (2020.01); *H04N 7/18* (2013.01)

(58) Field of Classification Search
CPC ............... B60Q 1/143; B60Q 2300/05; B60Q 2300/30; B60Q 2300/056; G01C 21/3844; G01S 13/867; G01S 13/931; G01S 2013/93271; G01S 2013/93274; G01S 2013/9322; G06V 20/584; G06V 10/25; G06V 20/56; H04N 7/18; G60Q 2300/42; F21S 41/60; F21V 23/0442; F21W 2102/13
See application file for complete search history.

(56) References Cited

U.S. PATENT DOCUMENTS

2017/0182931 A1*  6/2017  Son .................. B60Q 1/1423
2019/0032880 A1*  1/2019  Kim .................. F21V 5/007

FOREIGN PATENT DOCUMENTS

| KR | 10-2015-0020839 A | 2/2015 |
|---|---|---|
| KR | 20150020839 A  * | 2/2015 |

* cited by examiner

*Primary Examiner* — Marthe Y Marc-Coleman
(74) *Attorney, Agent, or Firm* — DLA Piper LLP (US)

(57) ABSTRACT

The present disclosure relates to a device and a method for controlling a vehicle. The device may include a camera for obtaining an image of a region around the vehicle and outputting image information, a navigation for outputting a current location of the vehicle as map information, a front radar for sensing an object in front of the vehicle and generating front radar information, a front-lateral radar for sensing an object in front of and lateral to the vehicle and generating front-lateral radar information, a lamp controller that generates a shadow zone code based on at least one of the image information, the map information, the front radar information, or the front-lateral radar information, and a lamp for forming a shadow zone in a light irradiation pattern based on the shadow zone code.

20 Claims, 6 Drawing Sheets

DEVICE AND METHOD FOR CONTROLLING LAMP FOR VEHICLE

CROSS-REFERENCE TO RELATED APPLICATION

This application claims the benefit of priority to Korean Patent Application No. 10-2019-0179593, filed in the Korean Intellectual Property Office on Dec. 31, 2019, the entire contents of which are incorporated herein by reference.

TECHNICAL FIELD

The present disclosure relates to a device and a method for controlling a lamp for controlling a light irradiation range of a headlamp disposed on a vehicle.

BACKGROUND

In general, a beam pattern implemented in a headlamp of a vehicle is largely divided into a low beam and a high beam.

A high beam pattern technology has an adaptive driving beam (ADB) mode. The ADB mode is operated in a high beam mode at ordinary times, and forms a shadow zone when a preceding vehicle appears, thereby securing a comfortable view to a driver of a present vehicle while preventing glare of a driver of another vehicle.

The general ADB mode secures the comfortable view to the driver of the present vehicle while not causing light pollution to the driver of another vehicle in a straight road section based on a nighttime light source recognition algorithm of a front camera. However, because the front camera is not able to be sense a vehicle crossing at an intersection or an access road, there is a problem of causing the light pollution to another vehicle.

SUMMARY

The present disclosure has been made to solve the above-mentioned problems occurring in the prior art while advantages achieved by the prior art are maintained intact.

An aspect of the present disclosure provides a device and a method for controlling a lamp for a vehicle that may sense a vehicle crossing at an intersection or an access road.

Another aspect of the present disclosure provides a device and a method for controlling a lamp for a vehicle that may sense a crossing vehicle at an intersection or an access road, and control a light irradiation pattern of a lamp based on a location of the sensed vehicle.

Another aspect of the present disclosure provides a device and a method for controlling a lamp for a vehicle that do not cause glare to a driver of a vehicle crossing at an intersection or an access road.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a lamp for a vehicle includes a camera for obtaining an image of a region around the vehicle and outputting image information, a navigation for outputting a current location of the vehicle as map information, a front radar for sensing an object in front of the vehicle and generating front radar information, a front-lateral radar for sensing an object in front of and lateral to the vehicle and generating front-lateral radar information, a lamp controller that generates a shadow zone code based on at least one of the image information, the map information, the front radar information, or the front-lateral radar information, and a lamp for forming a shadow zone in a light irradiation pattern based on the shadow zone code.

According to another aspect of the present disclosure, a method for controlling a lamp for a vehicle includes a time determination operation of determining whether it is nighttime or daytime from an image of a region around the vehicle, a location determination operation of determining whether a current location of the vehicle is a preset location from a navigation, an object detection operation of determining whether an object exists in front of and lateral to the vehicle when it is determined to be the nighttime in the time determination operation and when the current location of the vehicle is determined to be the preset location in the location determination operation, an object movement sensing operation of sensing a crossing movement of the object when the object exists in the front of and lateral to the vehicle in the object detection operation, and a shadow zone control operation of forming a shadow zone in a light irradiation pattern of the lamp based on the crossing movement of the object sensed in the object movement sensing operation.

According to another aspect of the present disclosure, a device for controlling a lamp for a vehicle includes a camera for obtaining an image of a region in front of the vehicle and outputting image information, a navigation for outputting a current location of the vehicle as map information, a front radar for sensing an object in front of the vehicle and generating front radar information, a front-lateral radar for sensing an object in front of and lateral to the vehicle and generating front-lateral radar information, a lamp controller that generates a shadow zone code based on a location of another crossing vehicle when the current location of a present vehicle is a preset location during nighttime travel, based on at least one of the image information, the map information, the front radar information, or the front-lateral radar information, and a lamp for forming a shadow zone in a light irradiation pattern based on the shadow zone code.

According to another aspect of the present disclosure, a method for controlling a lamp for a vehicle includes a time determination operation of determining whether it is nighttime or daytime from an image of a region around the vehicle, a location determination operation of determining whether a current location of the vehicle is a preset location from a navigation, an object detection operation of determining whether an object exists in front of and lateral to the vehicle when it is determined to be the nighttime in the time determination operation and when the current location of the vehicle is determined to be the preset location in the location determination operation, a daytime image determination algorithm operating operation of determining, when the object located in front of and lateral to the vehicle detected in the object detection operation is crossing, whether the crossing object in an image of a region in front of the vehicle is a vehicle using a daytime recognition algorithm, and a shadow zone control operation of forming a shadow zone in a light irradiation pattern of the lamp based on a crossing movement of the vehicle sensed in the daytime image determination algorithm operating operation.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
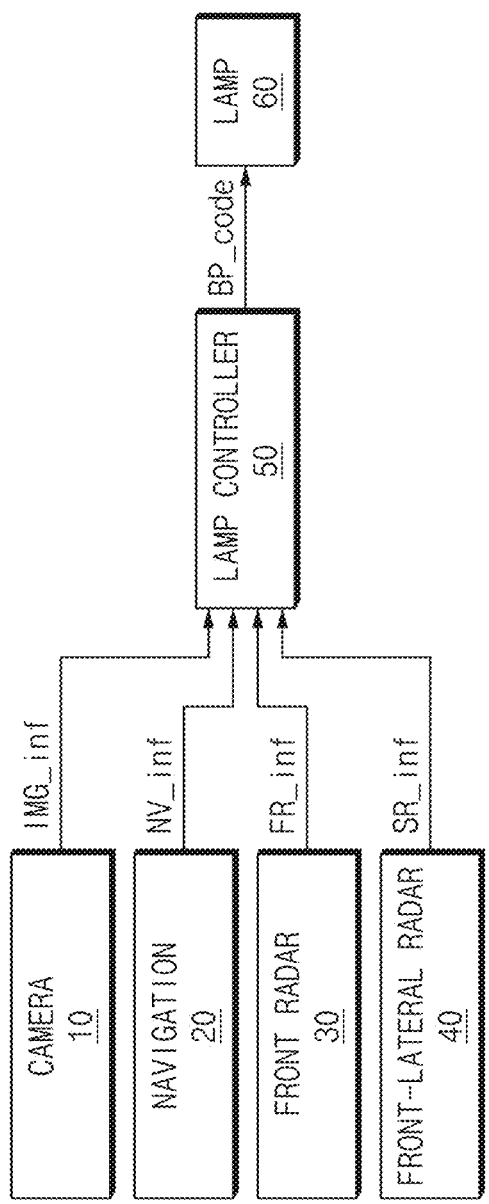
FIG. 1 is a view illustrating a configuration of a lamp control device for a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6.

FIG. 1 is a view illustrating a configuration of a lamp control device for a vehicle according to an embodiment of the present disclosure.

Referring to FIG. 1, a lamp control device for a vehicle according to an embodiment of the present disclosure may be implemented inside a vehicle. In this connection, the lamp control device for the vehicle may be integrally formed with internal control units of the vehicle, and may be implemented as a separate device and connected to the control units of the vehicle by separate connecting means.

Referring to FIG. 1, the lamp control device for the vehicle according to an embodiment of the present disclosure may include a camera 10, a navigation 20, a front radar 30, a front-lateral radar 40, a lamp controller 50, and a lamp 60.

The camera 10 may be a device for obtaining an image of a region around the vehicle.

For example, the camera 10 may be installed in the vehicle, obtain the image of the region around the vehicle, and output the obtained image as image information IMG_inf. More specifically, the camera 10 may be a front camera installed at a front side of the vehicle, and the image obtained from the camera 10 may be image information IMG_inf on an image of a front region of the vehicle.

The navigation 20 may be linked with a global positioning system (GPS) to output a shape of a road, line information, and information of various structures for a current location of the vehicle as map information NV_inf.

The front radar 30 may include a radar disposed at the front side of the vehicle to detect an object in front of the vehicle. The front radar 30 may sense the object in front of the vehicle and output the sensing result as front radar information FR_inf.

The front-lateral radar 40 may include a radar disposed at a front-lateral side of the vehicle to detect an object disposed in front of and lateral to the vehicle. The front-lateral radar 40 may sense the object disposed in front of and lateral to the vehicle, and output the sensing result as front-lateral radar information SR_inf.

Each of the front radar 30 and the front-lateral radar 40 may emit an electromagnetic wave in a direction of installation thereof via the electromagnetic wave, and detect the object based on an electromagnetic wave reflected from the object.

For example, each of the front radar 30 and the front-lateral radar 40 is able to detect a location of the detected object, a distance to the detected object, and a relative speed, and has an advantage of being able to perform long distance detection without being affected by environmental factors such as nighttime, snow, rain, fog, and the like.

The lamp controller 50 may generate a shadow zone code BP_code based on at least one of the image information IMG_inf, the map information NV_inf, the front radar information FR_inf, or the front-lateral radar information SR_inf.

For example, the lamp controller 50 may detect a vehicle crossing at an access road or an intersection based on at least one of the image information IMG_inf, the map information NV_inf, the front radar information FR_inf, or the front-lateral radar information SR_inf, and generate the shadow zone code BP_code for changing an irradiation pattern of light irradiated from the lamp 60 based on a location of the crossing vehicle.

More specifically, the lamp controller 50 may determine whether it is daytime or the nighttime based on the image information IMG_inf. The lamp controller 50 may determine whether the current location of the vehicle is the access road or the intersection based on the map information NV_inf. When it is the nighttime and the current location of the vehicle is the access road or the intersection, the lamp controller 50 may detect the object disposed in the front of and lateral to the present vehicle based on the front-lateral radar information SR_inf. The lamp controller 50 may detect a location based on a movement of the object detected based on the front-lateral radar information SR_inf and the front radar information FR_inf. When the crossing object is a vehicle, the lamp controller 50 may generate the shadow zone code BP_code based on the location of the object based on the front-lateral radar information SR_inf and the front radar information FR_inf.

The lamp 60 may form a shadow zone in the light irradiation pattern based on the shadow zone code BP_code.

Eventually, when the vehicle crossing at the access road or the intersection is detected, the lamp control device for the vehicle according to an embodiment of the present disclosure may generate the shadow zone code that forms the shadow zone at the location of the crossing vehicle to change the light irradiation pattern of the lamp based on the shadow zone code. Therefore, the lamp control device for the vehicle according to an embodiment of the present disclosure may not cause glare to a driver of the vehicle crossing at the access road or the intersection. In this connection, in the lamp control device for the vehicle according to an embodiment of the present disclosure, the technology of changing the light irradiation pattern of the lamp based on the location of the vehicle crossing at the access road or the intersection is disclosed. However, the present disclosure only discloses a technology of not causing glare to a driver of a vehicle crossing at a preset location, and does not limit the preset location to the access road and the intersection.

Figure 2:
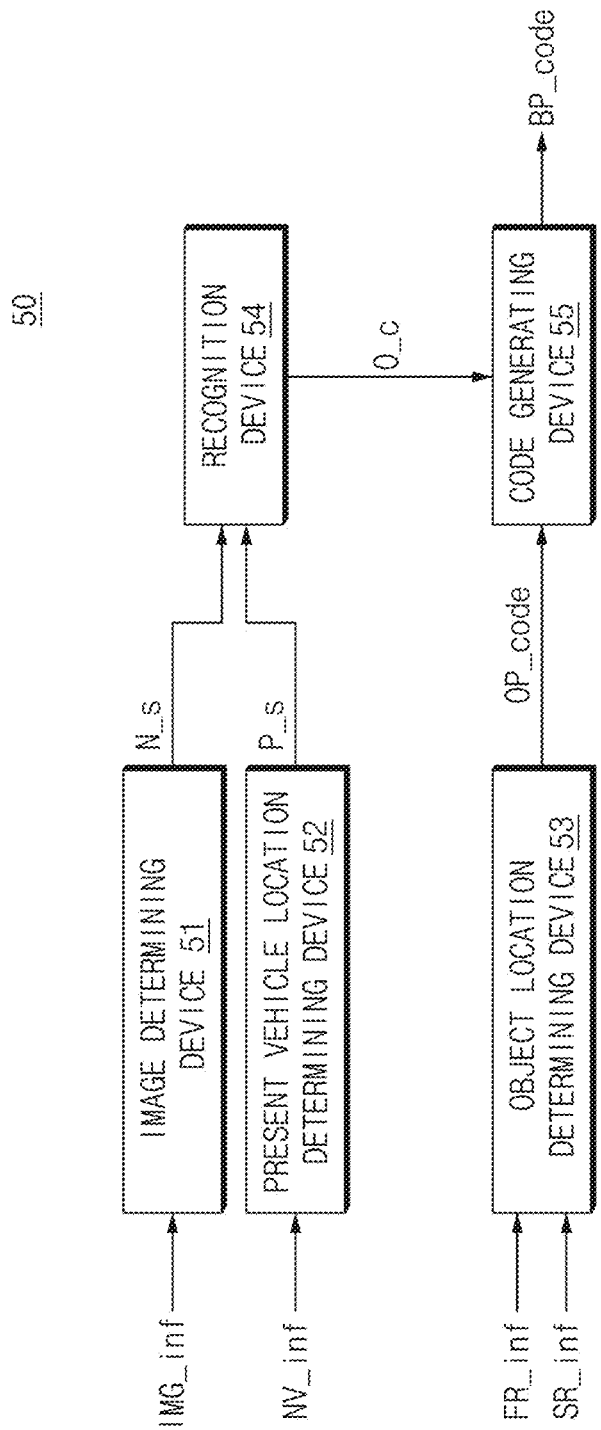
FIG. 2 is a view illustrating an embodiment of a lamp controller in a configuration of a lamp control device for a vehicle according to an embodiment of the present disclosure.

FIG. 2 is a view illustrating an embodiment of a lamp controller in a configuration of a lamp control device for a vehicle according to an embodiment of the present disclosure.

Referring to FIG. 2, the lamp controller 50 may include an image determining device 51, a present vehicle location determining device 52, an object location determining device 53, a recognition device 54, and a code generating device 55.

The image determining device 51 may determine the nighttime or the daytime based on the image information IMG_inf, that is, the image of the region around the vehicle, and output the determination result as image determination result N_s.

For example, the image determining device 51 may determine the nighttime and the daytime based on the image information IMG_inf, and output the image determination result N_s as signals of different levels based on the determination result.

The present vehicle location determining device 52 may determine whether the current location of the vehicle is the preset location, that is, the access road or the intersection, based on the map information NV_inf, and output the determination result as location determination result P_s.

For example, when the current location of the vehicle is the access road or the intersection based on the map information NV_inf, the present vehicle location determining device 52 may output the location determination result P_s as a signal of a level different from that of the access road and the intersection.

The object location determining device 53 may detect the object located in front of and lateral to the present vehicle based on the front radar information FR_inf and the front-lateral radar information SR_inf, and generate an object movement code OP_code corresponding to the location of the detected object. In this connection, the object location determining device 53 may detect the object located in front of and lateral to the present vehicle from the front-lateral radar information SR_inf, and generate the object movement code OP_code corresponding to the location of the moving object based on the front-lateral radar information SR_inf and the front radar information FR_inf when the object is detected.

The recognition device 54 may generate a code generation signal O_c based on the image determination result N_s of the image determining device 51 and the location determination result P_s of the present vehicle location determining device 52.

For example, when the image determination result N_s of the image determining device 51 is the nighttime, and when the location determination result P_s of the present vehicle location determining device 52 is the preset location (the access road or the intersection), the recognition device 54 may enable the code generation signal O_c.

On the other hand, when the image determination result N_s of the image determining device 51 is the daytime, and when the location determination result P_s of the present vehicle location determining device 52 is the preset location (the access road or the intersection), the recognition device 54 may disable the code generation signal O_c.

The code generating device 55 may generate the shadow zone code BP_code based on the code generation signal O_c and the object movement code OP_code.

For example, when the code generation signal O_c is enabled, the code generating device 55 may generate the shadow zone code BP_code having a code value corresponding to the object movement code OP_code.

In one example, when the code generation signal O_c is disabled, the code generating device 55 may initialize the shadow zone code BP_code to an initial value regardless of the object movement code OP_code.

When the shadow zone code BP_code is initialized, the lamp 60 may irradiate the light with a light irradiation pattern without the shadow zone.

Figure 3:
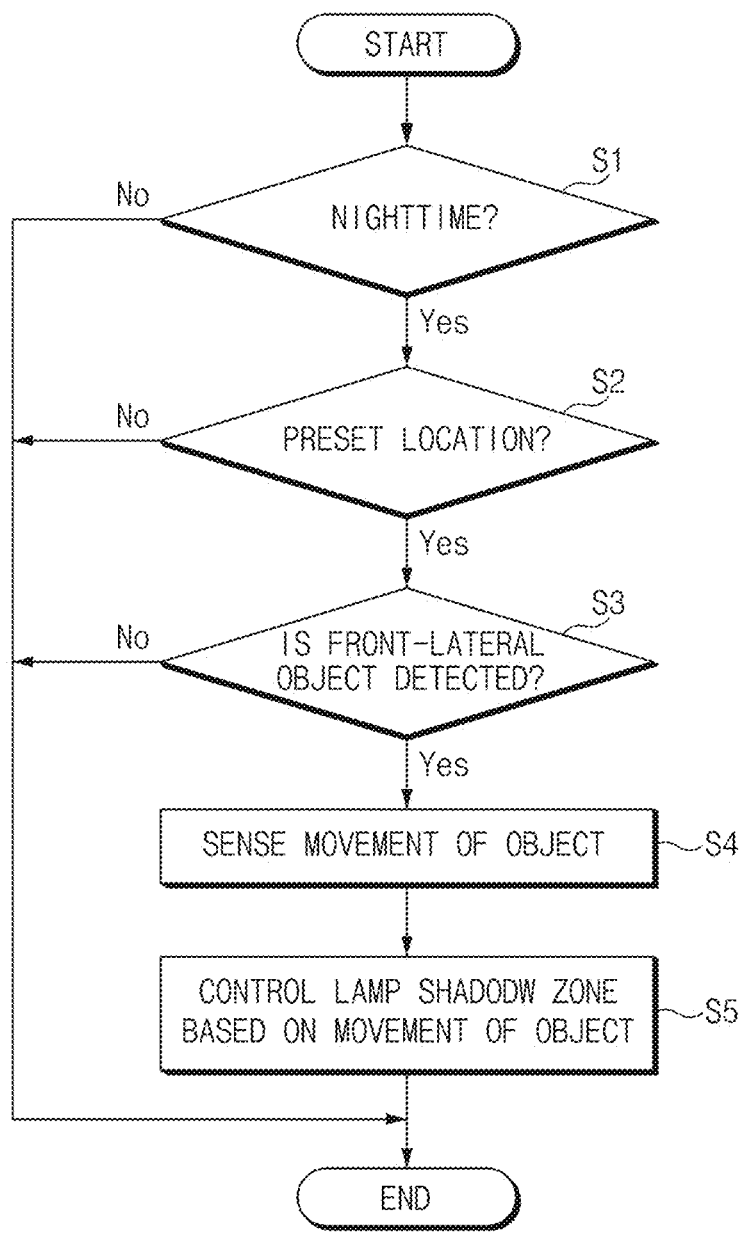
FIG. 3 is a flowchart for illustrating an operation of a lamp control device for a vehicle to which a lamp controller in FIG. 2 is applied.

FIG. 3 is a flowchart for illustrating an operation of a lamp control device for a vehicle to which a lamp controller in FIG. 2 is applied.

Referring to FIG. 3, a method for controlling a lamp for a vehicle according to an embodiment of the present disclosure may include time determination operation S1, location determination operation S2, object detection operation S3, object movement sensing operation S4, and shadow zone control operation S5.

The time determination operation S1 may include an operation of determining whether it is the nighttime or the daytime from the image of the region around the vehicle.

When it is determined in time determination operation S1 that it is the daytime (No), the method for controlling the lamp for the vehicle according to an embodiment of the present disclosure may be terminated.

On the other hand, when it is determined in time determination operation S1 that it is the nighttime (Yes), location determination operation S2 may be performed.

In this connection, time determination operation S1 may be performed based on the image information IMG_inf.

Location determination operation S2 is an operation of determining whether the current location of the vehicle is the preset location. When the current location of the vehicle is not the access road and the intersection (No) in location determination operation S2, the method for controlling the lamp for the vehicle according to an embodiment of the present disclosure may be terminated.

On the other hand, when the current location of the vehicle is the preset location, that is, the access road or the intersection (Yes) in location determination operation S2, object detection operation S3 may be performed.

In this connection, location determination operation S2 may be performed based on the map information NV_inf.

Object detection operation S3 is an operation of determining whether the object exists in front of and lateral to the present vehicle. When there is no object in front of and lateral to the present vehicle (No), the method for controlling the lamp for the vehicle according to an embodiment of the present disclosure may be terminated.

On the other hand, when there is the object in front of and lateral to the present vehicle (Yes), object movement sensing operation S4 may be performed.

In this connection, object detection operation S3 may be performed based on the front-lateral radar information SR_inf.

The object movement sensing operation S4 may include an operation of generating the shadow zone code BP_code based on the movement of the object located in front of and lateral to the present vehicle.

In this connection, object movement sensing operation S4 is for generating the shadow zone code BP_code based on the location of the vehicle moving from a region in front of and lateral to the present vehicle to a region in front of the present vehicle, that is, crossing at the access road or the intersection. Object movement sensing operation S4 may be performed based on the front-lateral radar information SR_inf and the front radar information FR_inf.

Shadow zone control operation S5 may include an operation of forming the shadow zone of the light irradiation pattern irradiated from the present vehicle based on the movement of the object, that is, the location of the object crossing at the access road or the intersection. That is, shadow zone control operation S5 may be performed by the shadow zone code BP_code to form the shadow zone based on the location of the crossing vehicle such that the glare is not caused to the driver of the vehicle crossing at the intersection or the access road.

As such, when the present vehicle is located at the preset location during the nighttime travel, and when the object is sensed at the region in front of and lateral to the present vehicle, the lamp control device for the vehicle according to an embodiment of the present disclosure forms the shadow zone in the light pattern irradiated from the lamp of the present vehicle based on the movement of the object, thereby not causing the glare to the driver of the crossing object, that is, the crossing vehicle.

Figure 4:
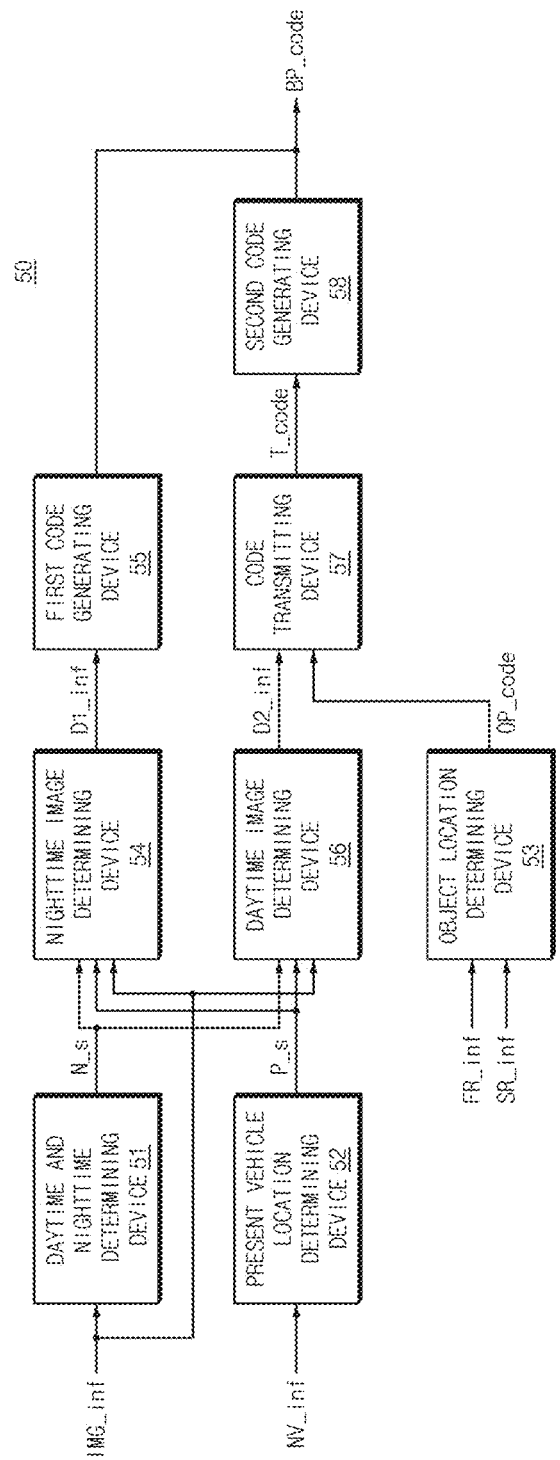
FIG. 4 is a view illustrating a configuration according to another embodiment of a lamp controller in a configuration of a lamp control device for a vehicle according to an embodiment of the present disclosure.

FIG. 4 is a view illustrating a configuration according to another embodiment of a lamp controller in a configuration of a lamp control device for a vehicle according to an embodiment of the present disclosure.

That is, FIG. 4 is a view illustrating a configuration according to another embodiment of the lamp controller 50 in the configuration of the lamp control device for the vehicle illustrated in FIG. 2.

Referring to FIG. 4, the lamp controller 50 may include a daytime and nighttime determining device 51, the present vehicle location determining device 52, the object location determining device 53, a nighttime image determining device 54, a first code generating device 55, a daytime image determining device 56, a code transmitting device 57, and a second code generating device 58.

The daytime and nighttime determining device 51 may determine the nighttime or the daytime based on the image of the region around the vehicle, that is, the image information IMG_inf, and output the determination result as time determination result N_s.

For example, the daytime and nighttime determining device 51 may determine the nighttime and the daytime based on the image information IMG_inf, and output the time determination result N_s as signals of different levels based on the determination result.

The present vehicle location determining device 52 may determine whether the current location of the vehicle is the preset location, that is, the access road or the intersection, based on the map information NV_inf, and output the determination result as the location determination result P_s.

For example, when the current location of the vehicle is the access road or the intersection based on the map information NV_inf, the present vehicle location determining device 52 may output the location determination result P_s as the signal of the level different from that of the access road and the intersection.

The object location determining device 53 may detect the object located in front of and lateral to the present vehicle based on the front radar information FR_inf and the front-lateral radar information SR_inf, and generate the object movement code OP_code corresponding to the location of the detected object. In this connection, the object location determining device 53 may detect the object located in front of and lateral to the present vehicle from the front-lateral radar information SR_inf, and generate the object movement code OP_code corresponding to the location of the moving object based on the front-lateral radar information SR_inf and the front radar information FR_inf when the object is detected.

When the present vehicle is not located at the preset location (e.g., the access road and the intersection) in the nighttime based on the time determination result N_s of the daytime and nighttime determining device 51 and the location determination result P_s of the present vehicle location determining device 52, the nighttime image determining device 54 may determine a presence and a location of a preceding vehicle in front of the present vehicle based on the image information IMG_inf of the region in front of the present vehicle, and output the determination result as a first image determination result D1_inf.

In this connection, the nighttime image determining device 54 may be a component that determines location information of the preceding vehicle based on a light source of the preceding vehicle from the image information IMG_inf using a nighttime recognition algorithm.

The first code generating device 55 may generate the shadow zone code BP_code corresponding to the location of the preceding vehicle based on the first image determination result D1_inf.

When the present vehicle is located at the preset location (e.g., the access road and the intersection) in the nighttime based on the time determination result N_s of the daytime and nighttime determining device 51 and the location determination result P_s of the present vehicle location determining device 52, the daytime image determining device 56 may determine the object located in front of the present vehicle based on the image information IMG_inf of the region in front of the present vehicle, and output the determination result as a second image determination result D2_inf.

In this connection, the daytime image determining device 56 may determine whether the object is the vehicle based on a contrast ratio of the image information IMG_inf using a daytime recognition algorithm.

When the second image determination result D2_inf of the daytime image determining device 56 is the vehicle, the code transmitting device 57 may transmit the object movement code OP_code of the object location determining device 53 to the second code generating device 58 as a transmission code T_code.

In one example, when the second image determination result D2_inf of the daytime image determining device 56 is not the vehicle, the code transmitting device 57 may block the object movement code OP_code of the object location determining device 53 from being transmitted to the second code generating device 58 as the transmission code T_code.

The second code generating device 58 may generate the shadow zone code BP_code corresponding to the transmission code T_code of the code transmitting device 57, that is, the location of the object (the vehicle) crossing at the intersection or the access road from the region in front of and lateral to the present vehicle to the region in front of the present vehicle.

When the present vehicle is not located at the preset location (the access road and the intersection) during the nighttime travel, the lamp control device for the vehicle according to an embodiment of the present disclosure configured as described above may generate the location information based on the light source of the preceding vehicle from the image of the region in front of the present vehicle using the nighttime recognition algorithm, and control a light emitting operation of the lamp 60 with a light irradiation pattern including a shadow zone based on the location of the preceding vehicle.

On the other hand, when the present vehicle is located at the preset location (the access road or the intersection) during the nighttime travel, the lamp control device for the vehicle according to an embodiment of the present disclosure may detect the object located in the front of and lateral to the present vehicle from the front-lateral radar 40, and sense the location of the object crossing the access road or the intersection from the front-lateral radar 40 and the front radar 30. The control device for the vehicle may determine the image information IMG_inf of the crossing object in front of the present vehicle using the daytime recognition algorithm, and control the light emitting operation of the lamp 60 with a light irradiation pattern including a shadow zone based on the location of the vehicle when the determined object is the vehicle.

Figure 5:
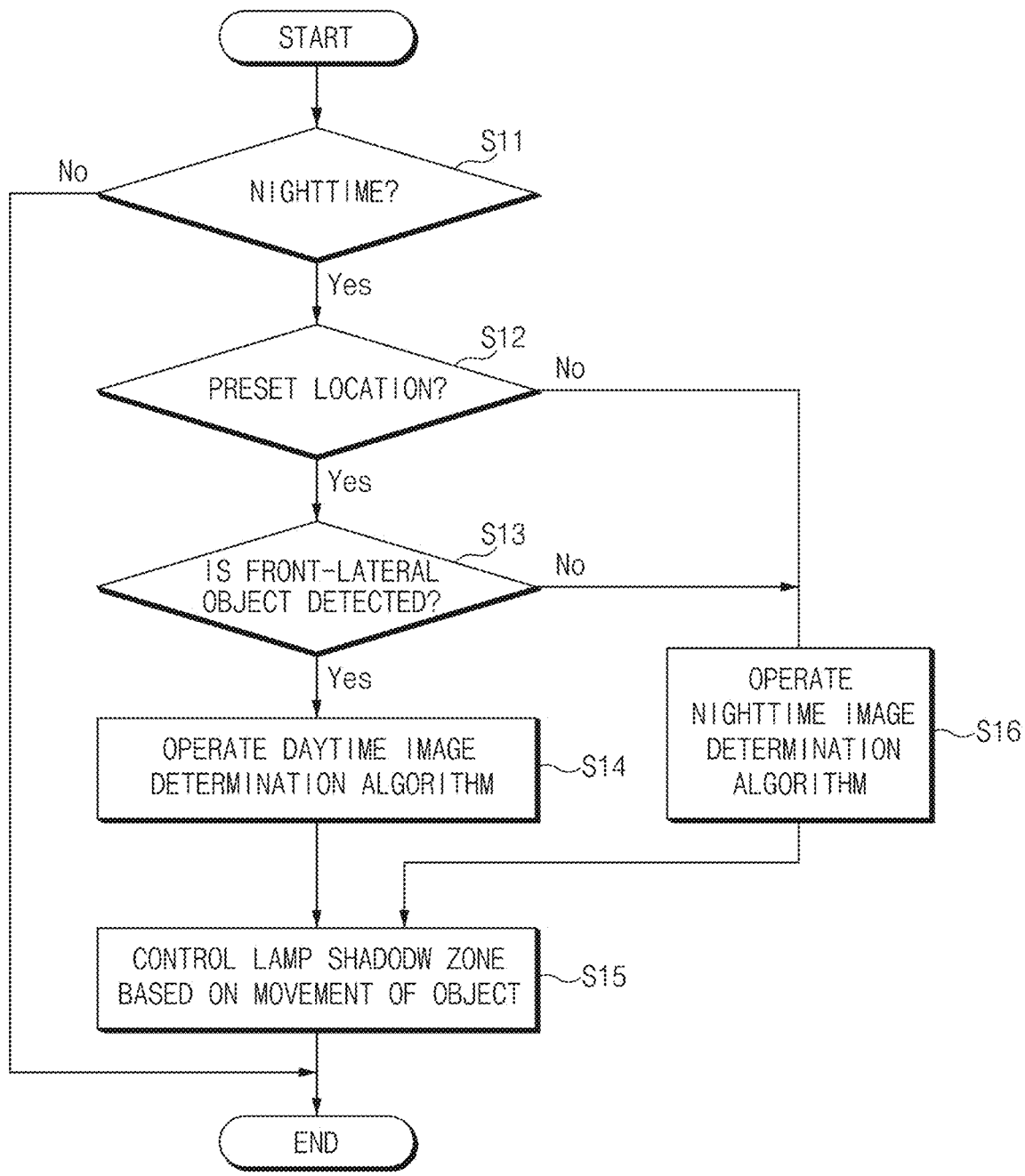
FIG. 5 is a flowchart for illustrating an operation of a lamp control device for a vehicle to which a lamp controller in FIG. 4 is applied.

FIG. 5 is a flowchart for illustrating an operation of a lamp control device for a vehicle to which a lamp controller in FIG. 4 is applied.

Referring to FIG. 5, a method for controlling a lamp for a vehicle according to another embodiment of the present disclosure may include time determination operation S11, location determination operation S12, object detection operation S13, daytime image determination algorithm operating operation S14, shadow zone control operation S15, and nighttime image determination algorithm operating operation S16.

The time determination operation S11 may include an operation of determining whether it is the nighttime or the daytime from the image of the region around the vehicle.

When it is determined in time determination operation S11 that it is the daytime (No), the method for controlling the lamp for the vehicle according to an embodiment of the present disclosure may be terminated.

On the other hand, when it is determined in time determination operation S11 that it is the nighttime (Yes), location determination operation S12 may be performed.

In this connection, time determination operation S11 may be performed based on the image information IMG_inf.

Location determination operation S12 is an operation of determining whether the current location of the vehicle is the preset location. When the current location of the vehicle is not the access road and the intersection (No) in location determination operation S12, nighttime image determination algorithm operating operation S16 may be performed.

On the other hand, when the current location of the vehicle is the preset location, that is, the access road or the intersection (Yes) in location determination operation S12, object detection operation S13 may be performed.

In this connection, location determination operation S12 may be performed based on the map information NV_inf.

Object detection operation S13 is an operation of determining whether the object exists in front of and lateral to the present vehicle. When there is no object in front of and lateral to the present vehicle (No), nighttime image determination algorithm operating operation S16 may be performed.

On the other hand, when there is the object in front of and lateral to the present vehicle (Yes), the daytime image determination algorithm operating operation S14 may be performed.

In this connection, object detection operation S13 may be performed based on the front-lateral radar information SR_inf.

The daytime image determination algorithm operating operation S14 may include an operation of determining the image information IMG_inf with the daytime recognition algorithm when the object located in front of and lateral to the present vehicle is moved and contained in the image information IMG_inf of the region in front of the present vehicle.

Shadow zone control operation S15 may include an operation of forming the shadow zone in the light irradiation pattern irradiated from the present vehicle based on the location of the vehicle when it is determined in daytime image determination algorithm operating operation S14 that the object is the vehicle.

Nighttime image determination algorithm operating operation S16 is an operation performed when the present vehicle is not at the preset location (the access road and the intersection) during the nighttime travel, or when the present vehicle is at the preset location (the access road or the intersection) during the nighttime travel and there is no object detected in front of or lateral to the present vehicle. Nighttime image determination algorithm operating operation S16 may include an operation of determining the object as the preceding vehicle using the nighttime recognition algorithm when a light source of a preset form is contained in the image information IMG_inf of the region in front of the vehicle, and generating the location of the preceding vehicle.

Shadow zone control operation S15 performed after nighttime image determination algorithm operating operation S16 may include an operation of forming the shadow zone in the light irradiation pattern irradiated from the present vehicle based on the location of the preceding vehicle.

As such, when the present vehicle is located at the preset location during the nighttime travel, and when the object is sensed at the region in front of and lateral to the present vehicle and the sensed object is the vehicle, the lamp control device for the vehicle according to the present disclosure forms the shadow zone in the light pattern irradiated from the lamp of the present vehicle based on the movement of the object, thereby not causing the glare to the driver of the crossing object, that is, the crossing vehicle.

In addition, when the vehicle is not currently located at the preset location (the access road and the intersection) during the nighttime travel, and when the light source of the preset form is contained in the image information of the region in front of the vehicle, the lamp control device for the vehicle according to the present disclosure may determine the object as the preceding vehicle, and form the light pattern including the shadow zone based on the location of the preceding vehicle, thereby not causing the glare to the driver of the preceding vehicle.

Figure 6:
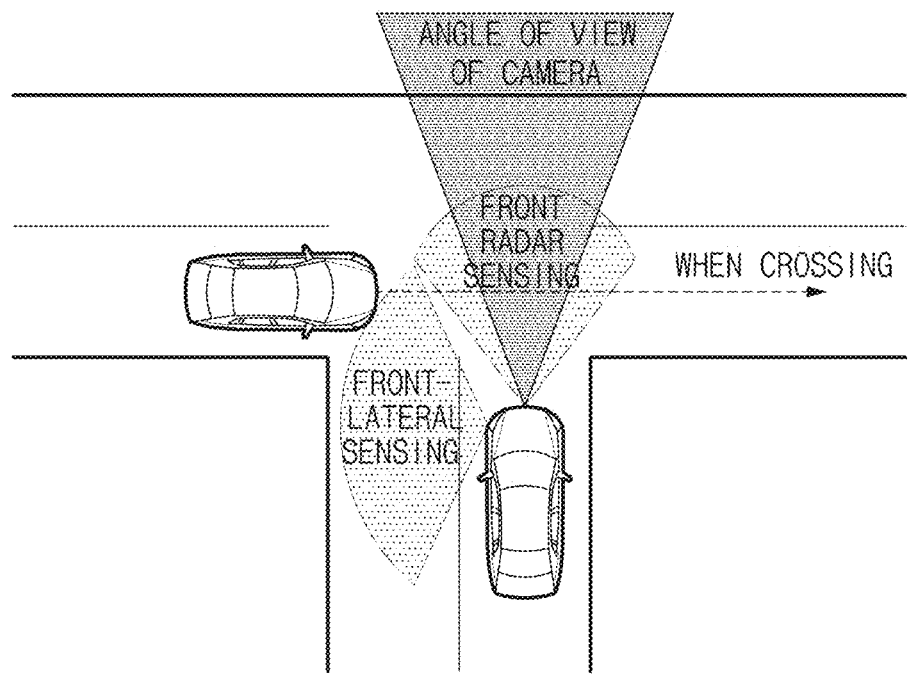
FIG. 6 is a view for illustrating a lamp control device for a vehicle according to an embodiment of the present disclosure.

FIG. 6 is a view for illustrating a lamp control device for a vehicle according to an embodiment of the present disclosure. FIG. 6 is a view illustrating sensing ranges of the camera, the front radar, and the front-lateral radar that may be included in the lamp control device for the vehicle.

Referring to FIG. 6, the object located in front of and lateral to the present vehicle may be sensed through front-lateral sensing, the location of the object based on the crossing of the object may be detected through the front-lateral sensing and front radar sensing, and whether the object is the vehicle may be determined by determining the image information using the daytime recognition algorithm when the crossing object enters an angle of view of the camera.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology may sense the vehicle crossing at the intersection or the access road, and control the light irradiation pattern of the lamp based on the location of the sensed crossing vehicle, thereby not causing the glare to the driver of another vehicle.

In addition, the present technology is advantageous in cost reduction because the present technology may be applied to the vehicle without adding sensor cost, by using the existing sensors installed in the vehicle.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a lamp for a vehicle, the device comprising:
    a camera for obtaining an image of a region around the vehicle and outputting image information;
    a navigation for outputting a current location of the vehicle as map information;
    a front radar for sensing an object in front of the vehicle and generating front radar information;
    a front-lateral radar for sensing an object in front of and lateral to the vehicle and generating front-lateral radar information;
    a lamp controller configured to generate a shadow zone code based on at least one of the image information, the map information, the front radar information, or the front-lateral radar information; and
    a lamp for forming a shadow zone in a light irradiation pattern based on the shadow zone code.

2. The device of claim 1, wherein the lamp controller is configured to:
    determine whether it is nighttime or daytime based on the image information;
    determine whether the current location of the vehicle is a preset location based on the map information;
    determine a crossing movement of the object based on the front-lateral radar information and the front radar information; and
    generate the shadow zone code such that the shadow zone is formed in the light irradiation pattern based on the crossing movement of the object when it is the nighttime based on the image information, and the current location of the vehicle is the preset location based on the map information.

3. The device of claim 1, wherein the lamp controller includes:
    an image determining device configured to determine whether it is nighttime or daytime based on the image information;
    a present vehicle location determining device configured to determine whether the current location of the vehicle is a preset location based on the map information;
    an object location determining device configured to detect the object based on the front-lateral radar information and the front radar information, and sense a crossing movement of the detected object;
    a recognition device configured to enable a code generation signal when the determination result of the image determining device is the nighttime and the determination result of the present vehicle location determining device is the preset location; and
    a code generating device configured to generate the shadow zone code such that the shadow zone is formed in the light irradiation pattern based on the crossing movement of the object of the object location determining device when the code generation signal is enabled.

4. A method for controlling a lamp for a vehicle, the method comprising:
    a time determination operation of determining whether it is nighttime or daytime from an image of a region around the vehicle;
    a location determination operation of determining whether a current location of the vehicle is a preset location from a navigation;
    an object detection operation of determining whether an object exists in front of and lateral to the vehicle when it is determined to be the nighttime in the time determination operation and when the current location of the vehicle is determined to be the preset location in the location determination operation;
    an object movement sensing operation of sensing a crossing movement of the object when the object exists in the front of and lateral to the vehicle in the object detection operation; and
    a shadow zone control operation of forming a shadow zone in a light irradiation pattern of the lamp based on the crossing movement of the object sensed in the object movement sensing operation.

5. The method of claim 4, wherein the preset location is an access road or an intersection.

6. The method of claim 4, wherein the object detection operation is an operation performed based on a sensing result of a front-lateral radar disposed at a front-lateral side of the vehicle,
    wherein the object movement sensing operation is an operation performed based on a sensing result of a front radar disposed at a front side of the vehicle and the sensing result of the front-lateral radar.

7. The method of claim 4, wherein the object movement sensing operation includes:
generating an object movement code based on the crossing movement of the object,
wherein the shadow zone control operation includes:
generating a shadow zone code corresponding to the object movement code, and forming the shadow zone at a location corresponding to the shadow zone code.

8. A device for controlling a lamp for a vehicle, the device comprising:
a camera for obtaining an image of a region in front of the vehicle and outputting image information;
a navigation for outputting a current location of the vehicle as map information;
a front radar for sensing an object in front of the vehicle and generating front radar information;
a front-lateral radar for sensing an object in front of and lateral to the vehicle and generating front-lateral radar information;
a lamp controller configured to generate a shadow zone code based on a location of another crossing vehicle when the current location of a present vehicle is a preset location during nighttime travel, based on at least one of the image information, the map information, the front radar information, or the front-lateral radar information; and
a lamp for forming a shadow zone in a light irradiation pattern based on the shadow zone code.

9. The device of claim 8, wherein the lamp controller is configured to:
determine whether it is a nighttime or daytime based on the image information;
determine whether the current location of the vehicle is the preset location based on the map information;
detect the object in front of and lateral to the vehicle based on the front-lateral radar information;
sense a crossing movement of the detected object based on the front-lateral radar information and the front radar information;
determine whether the object is a crossing vehicle based on the image information; and
generate the shadow zone code based on a location of the crossing vehicle.

10. The device of claim 8, wherein the lamp controller includes:
a daytime and nighttime determining device configured to determine whether it is a nighttime or daytime based on the image information;
a present vehicle location determining device configured to determine whether the current location of a present vehicle is the preset location based on the map information;
an object location determining device configured to detect the object in front of and lateral to the vehicle based on the front-lateral radar information, and sense a crossing movement of the detected object based on the front-lateral radar information and the front radar information, thereby determining a location of the object;
a nighttime image determining device configured to determine the image information using a nighttime recognition algorithm when the daytime and nighttime determining device determines that it is the nighttime, and the present vehicle location determining device determines that the current location of the present vehicle is not the preset location;
a daytime image determining device configured to determine the image information using a daytime recognition algorithm when the daytime and nighttime determining device determines that it is the nighttime, and the present vehicle location determining device determines that the current location of the present vehicle is the preset location;
a first code generating device configured to receive a location of a preceding vehicle from the nighttime image determining device and generate the shadow zone code;
a code transmitting device configured to transmit an object movement code based on the location of the object provided from the object location determining device to a second code generating device when the image information is determined as a vehicle from the daytime image determining device; and
the second code generating device configured to generate the shadow zone code based on the object movement code transmitted from the code transmitting device.

11. The device of claim 10, wherein the nighttime recognition algorithm includes an algorithm for determining a light source of a preset form in the image information as the preceding vehicle,
wherein the daytime recognition algorithm includes an algorithm for determining whether the object is a vehicle based on a contrast ratio of the image information.

12. The device of claim 10, wherein the code transmitting device is configured to block the transmission of the object movement code to the second code generating device when the image information is not determined as the vehicle from the daytime image determining device.

13. A method for controlling a lamp for a vehicle, the method comprising:
a time determination operation of determining whether it is nighttime or daytime from an image of a region around the vehicle;
a location determination operation of determining whether a current location of the vehicle is a preset location from a navigation;
an object detection operation of determining whether an object exists in front of and lateral to the vehicle when it is determined to be the nighttime in the time determination operation and when the current location of the vehicle is determined to be the preset location in the location determination operation;
a daytime image determination algorithm operating operation of determining, when the object located in front of and lateral to the vehicle detected in the object detection operation is crossing, whether the crossing object in an image of a region in front of the vehicle is a vehicle using a daytime recognition algorithm; and
a shadow zone control operation of forming a shadow zone in a light irradiation pattern of the lamp based on a crossing movement of the vehicle sensed in the daytime image determination algorithm operating operation.

14. The method of claim 13, wherein the daytime recognition algorithm includes an algorithm for determining the object based on a contrast ratio of the image.

15. The method of claim 13, further comprising:
a nighttime image determination algorithm operating operation of determining a preceding vehicle in the image of the region in front of the vehicle using a nighttime recognition algorithm when it is determined to be the nighttime in the time determination operation and when the current location of the vehicle is determined not to be the preset location in the location determination operation.

16. The method of claim 15, wherein the nighttime recognition algorithm includes an algorithm for determining the preceding vehicle based on a light source of the image.

17. The method of claim 16, further comprising:
an operation of performing the shadow zone control operation after the nighttime image determination algorithm operating operation,
wherein the shadow zone control operation performed after the nighttime image determination algorithm operating operation includes:
generating the shadow zone in the light irradiation pattern of the lamp based on a location of the preceding vehicle.

18. The method of claim 13, further comprising:
a nighttime image determination algorithm operating operation of determining a preceding vehicle in the image of the region in front of the vehicle using a nighttime recognition algorithm when the object does not exist in front of and lateral to the vehicle in the object detection operation.

19. The method of claim 18, wherein the nighttime recognition algorithm includes an algorithm for determining the preceding vehicle based on a light source of the image.

20. The method of claim 19, further comprising:
an operation of performing the shadow zone control operation after the nighttime image determination algorithm operating operation,
wherein the shadow zone control operation performed after the nighttime image determination algorithm operating operation includes:
generating the shadow zone in the light irradiation pattern of the lamp based on a location of the preceding vehicle.

* * * * *